United States Patent
Jeon et al.

(10) Patent No.: US 9,846,925 B2
(45) Date of Patent: Dec. 19, 2017

(54) DEFOG SYSTEM AND DEFOG METHOD

(71) Applicant: Hanwha Techwin Co., Ltd., Changwon-si (KR)

(72) Inventors: Seongha Jeon, Changwon-si (KR); Youngje Jung, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/063,646

(22) Filed: Mar. 8, 2016

(65) Prior Publication Data

US 2016/0328832 A1 Nov. 10, 2016

(30) Foreign Application Priority Data

May 8, 2015 (KR) .................. 10-2015-0064900

(51) Int. Cl.
*G06K 9/40* (2006.01)
*G06T 5/40* (2006.01)
*G06T 5/00* (2006.01)

(52) U.S. Cl.
CPC ............ *G06T 5/40* (2013.01); *G06T 5/007* (2013.01); *G06T 2207/30232* (2013.01)

(58) Field of Classification Search
CPC  G06T 5/009; G06T 5/005; G06T 5/40; G06T 2207/30232; G06T 2207/20208

USPC ........................................... 382/274
See application file for complete search history.

(56) References Cited

U.S. PATENT DOCUMENTS

| 9,317,910 | B2 * | 4/2016 | Jeon ............... G06T 5/009 |
| 2008/0316349 | A1 * | 12/2008 | Toyoda ........... H04N 5/2351 |
| | | | 348/333.01 |
| 2012/0294482 | A1 * | 11/2012 | Kasaoki .......... G06K 9/4647 |
| | | | 382/103 |

FOREIGN PATENT DOCUMENTS

| JP | 2011-3048 A | 1/2011 |
| JP | 2012-243049 A | 12/2012 |
| KR | 10-2010-0021952 A | 2/2010 |

* cited by examiner

*Primary Examiner* — Andrew Moyer
(74) *Attorney, Agent, or Firm* — Sughrue Mion, PLLC

(57) ABSTRACT

A defog system and a defog method are provided. The defog system includes an illuminance sensor configured to detect ambient illuminance, and at least one processor to implement a level determiner configured to determine a defog level of an input image based on the ambient illuminance. The at least one processor further implements a defogger configured to determine whether to defog the input image based on skewness and kurtosis of a histogram of the input image, and, in response to the defogger determining to defog the input image, determine a fog condition of the input image based on a cumulative probability of the histogram, and defog the input image based on the defog level.

16 Claims, 12 Drawing Sheets

FIG. 5

| Histogram | Y data[11:0] | Histogram | Y data[11:0] | Histogram | Y data[11:0] |
|---|---|---|---|---|---|
| HIST[0] | 0=<Y<2 | HIST[16] | 24=<Y<27 | HIST[32] | 182=<Y<207 | HIST[48] | 1449=<Y<1650 |
| HIST[1] | Y=2 | HIST[17] | 27=<Y<30 | HIST[33] | 207=<Y<236 | HIST[49] | 1650=<Y<1879 |
| HIST[2] | Y=3 | HIST[18] | 30=<Y<34 | HIST[34] | 236=<Y<268 | HIST[50] | 1879=<Y<2139 |
| HIST[3] | Y=4 | HIST[19] | 34=<Y<39 | HIST[35] | 268=<Y<305 | HIST[51] | 2139=<Y<2436 |
| HIST[4] | Y=5 | HIST[20] | 39=<Y<44 | HIST[36] | 305=<Y<348 | HIST[52] | 2436=<Y<2774 |
| HIST[5] | Y=6 | HIST[21] | 44=<Y<50 | HIST[37] | 348=<Y<396 | HIST[53] | 2774=<Y<3159 |
| HIST[6] | Y=7 | HIST[22] | 50=<Y<57 | HIST[38] | 396=<Y<451 | HIST[54] | 3159=<Y<3597 |
| HIST[7] | Y=8 | HIST[23] | 57=<Y<65 | HIST[39] | 451=<Y<513 | HIST[55] | 3597=<Y |
| HIST[8] | Y=9 | HIST[24] | 65=<Y<74 | HIST[40] | 513=<Y<584 | | |
| HIST[9] | Y=10 | HIST[25] | 74=<Y<84 | HIST[41] | 584=<Y<665 | | |
| HIST[10] | 11=<Y<13 | HIST[26] | 84=<Y<96 | HIST[42] | 665=<Y<757 | | |
| HIST[11] | Y=13 | HIST[27] | 96=<Y<109 | HIST[43] | 757=<Y<862 | | |
| HIST[12] | 14=<Y<16 | HIST[28] | 109=<Y<124 | HIST[44] | 862=<Y<981 | | |
| HIST[13] | 16=<Y<18 | HIST[29] | 124=<Y<141 | HIST[45] | 981=<Y<1117 | | |
| HIST[14] | 18=<Y<21 | HIST[30] | 141=<Y<160 | HIST[46] | 1117=<Y<1272 | | |
| HIST[15] | 21=<Y<24 | HIST[31] | 160=<Y<182 | HIST[47] | 1272=<Y<1449 | | |

DEFOG SYSTEM AND DEFOG METHOD

CROSS-REFERENCE TO RELATED APPLICATION

This application claims priority from Korean Patent Application No. 10-2015-0064900, filed on May 8, 2015, in the Korean Intellectual Property Office, the disclosure of which is incorporated herein by reference in its entirety.

BACKGROUND

1. Field

Apparatuses and methods consistent with exemplary embodiments relate to a defog system and a defog method.

2. Description of the Related Art

Because a general closed-circuit television (CCTV) may have to continuously monitor an environment 24 hours a day, when fog is present in the monitored environment, a defog function may be used to improve a quality of an image.

Most CCTVs that have a defog function may be manually controlled. In other words, the CCTVs may not have a function of automatically removing fog by checking a current fog condition, and even if they do, the function may be performed during night time darkness or even when there is no fog, and thus a quality of an image may be deteriorated.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a defog system and a defog method, in which a defog function is adaptively performed according to a current fog condition and illuminance.

According to an aspect of an exemplary embodiment, there is provided a defog system including an illuminance sensor configured to detect ambient illuminance, and at least one processor to implement a level determiner configured to determine a defog level of an input image based on the ambient illuminance. The at least one processor further implements a defogger configured to determine whether to defog the input image based on skewness and kurtosis of a histogram of the input image, and, in response to the defogger determining to defog the input image, determine a fog condition of the input image based on a cumulative probability of the histogram, and defog the input image based on the defog level.

The defogger may include a histogram generator configured to generate the histogram of the input image, and an analyzer configured to determine the skewness and the kurtosis of the histogram. The defogger may further include a fog detector configured to, in response to the skewness and the kurtosis being within a range, detect a first minimum luminance, in which the cumulative probability of the histogram corresponds to a minimum reference probability, and a first maximum luminance, in which the cumulative probability of the histogram corresponds to a maximum reference probability. The defogger may further include a scaler configured to scale the input image by resetting the first minimum luminance and the first maximum luminance respectively to a second minimum luminance and a second maximum luminance based on the defog level.

The second minimum luminance may be less than the first minimum luminance, and the second maximum luminance may be greater than the first maximum luminance.

The fog detector may be further configured to, in response to at least one among the skewness and the kurtosis being outside the range, reduce the minimum reference probability, and detect the first minimum luminance, in which the cumulative probability of the histogram corresponds to the reduced minimum reference probability.

The fog detector may be further configured to reduce the minimum reference probability in proportion to a degree to which the at least one among the skewness and the kurtosis is outside the range.

The scaler may be further configured to reduce, as the defog level decreases, an adjustment width between the first minimum luminance and the second minimum luminance and an adjustment width between the first maximum luminance and the second maximum luminance.

The level determiner may be further configured to output a maximum defog level signal in response to an amplification value of the ambient illuminance being less than a first threshold, output a minimum defog level signal in response to the amplification value being greater than a second threshold, and output a respective defog level signal in response to the amplification value being between the first threshold and the second threshold.

The level determiner may be further configured to change the respective defog level signal as the amplification value changes between the first threshold and the second threshold.

The level determiner may be further configured to reduce the respective defog level signal as the amplification value changes from the first threshold to the second threshold.

The defog system may further include an edge detector configured to detect an edge amount of the input image, and a gamma applier configured to, in response to the edge amount being less than or equal to a threshold, apply a gamma curve to the defogged input image based on a relationship between the edge amount and a preset luminance.

According to an aspect of another exemplary embodiment, there is provided a defog method including detecting an ambient illuminance, determining a defog level of an input image based on the ambient illuminance, and determining whether to defog the input image based on skewness and kurtosis of a histogram of the input image. The defog method further includes, in response to the determining to defog the input image, determining a fog condition of the input image based on a cumulative probability of the histogram, and defogging the input image based on the defog level.

The defog method may further include generating the histogram of the input image, and determining the skewness and the kurtosis of the histogram. The determining the fog condition may include, in response to the skewness and the kurtosis being within a range, detecting a first minimum luminance, in which the cumulative probability of the histogram corresponds to a minimum reference probability, and a first maximum luminance, in which the cumulative probability of the histogram corresponds to a maximum reference probability. The defogging the input image may include scaling the input image by resetting the first minimum luminance and the first maximum luminance respectively to a second minimum luminance and a second maximum luminance based on the defog level.

The second minimum luminance may be less than the first minimum luminance, and the second maximum luminance may be greater than the first maximum luminance.

The determining the fog condition may further include, in response to at least one among the skewness and the kurtosis being outside the range, reducing the minimum reference probability, and detecting the first minimum luminance, in which the cumulative probability of the histogram corresponds to the reduced minimum reference probability.

The reducing the minimum reference probability may include reducing the minimum reference probability in proportion to a degree to which the at least one among the skewness and the kurtosis is outside the range.

The scaling the input image may include reducing, as the defog level decreases, an adjustment width between the first minimum luminance and the second minimum luminance and an adjustment width between the first maximum luminance and the second maximum luminance.

The determining the defog level may include outputting a maximum defog level signal in response to an amplification value of the ambient illuminance being less than a first threshold, outputting a minimum defog level signal in response to the amplification value being greater than a second threshold, and outputting a respective defog level signal in response to the amplification value being between the first threshold and the second threshold.

The outputting the respective defog level signal may include changing the respective defog level signal as the amplification value changes between the first threshold and second threshold.

The outputting the respective defog level signal may include reducing the respective defog level signal as the amplification value changes from the first threshold to the second threshold.

The defog method may further include detecting an edge amount of the input image, and, in response to the edge amount being less than or equal to a threshold, applying a gamma curve to the defogged input image based on a relationship between the edge amount and a preset luminance.

BRIEF DESCRIPTION OF THE DRAWINGS

The above and/or other aspects will be more apparent by describing exemplary embodiments with reference to the accompanying drawings, in which:

FIG. 5 is a table of a histogram of a log scale with respect to 12-bit input image data, according to an exemplary embodiment;

DETAILED DESCRIPTION

Figure 1:
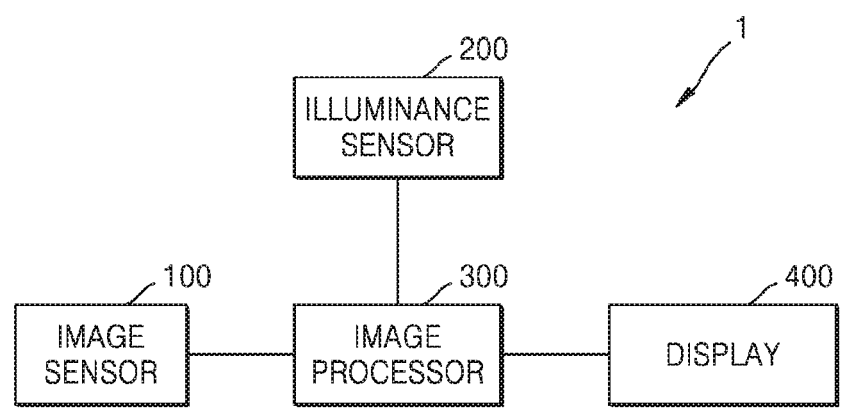
FIG. 1 is a block diagram of a defog system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

Accordingly, functions of various components illustrated in drawings including functional blocks displayed as processors or in similar concepts of the processors may be provided by using not only exclusive hardware but also hardware having capabilities for executing suitable software. When functions are provided by processors, the functions may be provided by a single exclusive processor, a single shared processor, or a plurality of individual processors, and some of the functions may be shared. Processors, controls, or terms suggested in similar concepts thereof may not be interpreted by exclusively referring to hardware having capabilities for executing software, but may be construed as implicitly and unlimitedly including digital signal processor (DSP) hardware, or read-only memory (ROM), random access memory (RAM), or nonvolatile memory for storing software. Other well-known hardware may be further included. In addition, the terms such as "unit," "-er (-or)," and "module" described in the specification refer to an element for performing at least one function or operation, and may be implemented in hardware, software, or the combination of hardware and software.

Also, when a region "includes" an element, the region may further include another element instead of excluding the other element, otherwise differently stated.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a defog system 1 according to an exemplary embodiment.

Referring to FIG. 1, the defog system 1 or defog apparatus according to an exemplary embodiment includes an image sensor 100, an illuminance sensor 200, an image processor 300, and a display 400.

The image sensor 100 is realized as any type of camera, such as a pan, tilt, and zoom (PTZ) camera, and is connected to the image processor 300 wirelessly or via wires. The image sensor 100 may use a photoelectric conversion device, such as a charge coupled device (CCD) or a complementary metal oxide semiconductor (CMOS). The image sensor 100 obtains image information by photographing a front scene. A lens receiving a light signal may be provided at a front end of the image sensor 100.

The illuminance sensor 200 detects illuminance and illuminance change of a photographing region. The illuminance sensor 200 amplifies a detection signal with respect to ambient brightness, and outputs the amplified detection signal to the image processor 300. An amplification value (or a gain) of the detection signal increases when the surroundings are darker. Thus, a level of the detection signal of the illuminance sensor 200 and the amplification value are inversely proportional to each other.

The image processor 300 determines whether to perform a defog function by analyzing a luminance distribution of an image signal input from the image sensor 100, and detects a fog condition. The image processor 300 determines a defog degree with respect to the image signal based on an illuminance detection signal input from the illuminance sensor 200. The image processor 300 determines whether to perform defog compensation on an input image and a performance degree based on a tendency of the luminance distribution of the image signal and the illuminance detection signal. Accordingly, the defog function may not be performed, or a lowest level of the defog function may be performed, in a case of a low illuminance image, an image darkened by a nearby building, or an image saturated by sunlight, to reduce image quality deterioration caused by removing fog. The image processor 300 may adaptively perform the defog function by gradually adjusting the defog degree according to the illuminance change when the defog compensation is performed on the input image. Also, when the defog compensation is not performed on the input image, the image processor 300 may not finally perform the defog compensation by gradually adjusting the defog degree.

The display 400 may perform signal processing and provide, to a user, an image output from the image processor 300, thereby enabling the user to monitor a displayed image. The display 400 may include a liquid crystal display (LCD), an organic light-emitting display (OLED) panel, or an electrophoretic display (EPD) panel. The display 400 may be provided as a touch screen for receiving a user input via touch to operate as a user input interface.

Figure 2:
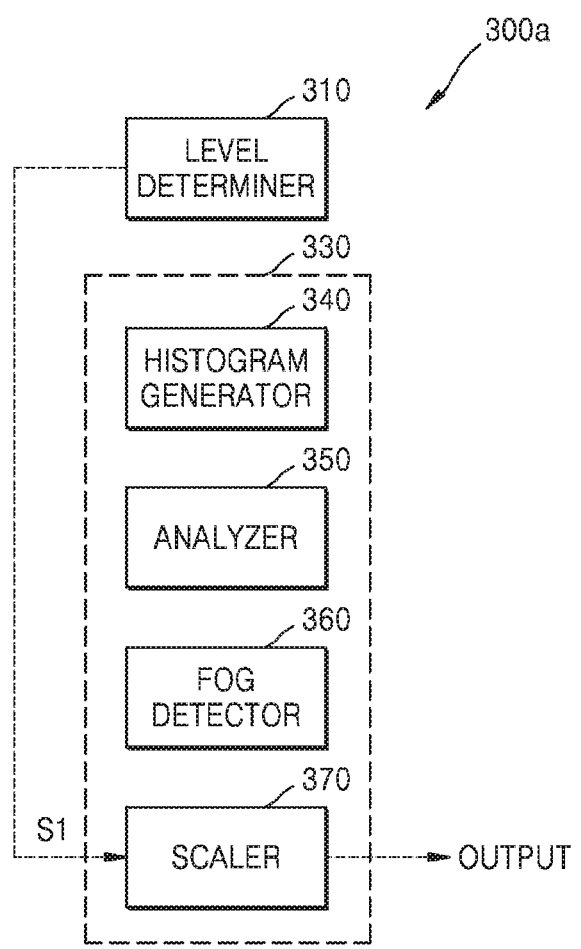
FIG. 2 is a block diagram of an image processor according to an exemplary embodiment.

FIG. 2 is a block diagram of an image processor 300*a* according to an exemplary embodiment.

Referring to FIG. 2, the image processor 300*a* according to an exemplary embodiment includes a level determiner 310 and a defogger 330.

The level determiner 310 may determine a defog level with respect to an input image according to an amplification value of an illuminance detection signal input from the illuminance sensor 200. The level determiner 310 outputs a control signal S1 corresponding to the defog level. The level determiner 310 outputs a maximum defog level when the amplification value is less than a first threshold value. The maximum defog level signal is a control signal in which a defog degree is highest. The level determiner 310 outputs a minimum defog level signal when the amplification value is greater than a second threshold value. The minimum defog level signal is a control signal in which a defog function is not performed. The level determiner 310 outputs a respective defog level signal when the amplification value is between the first and second threshold values.

Figure 4:
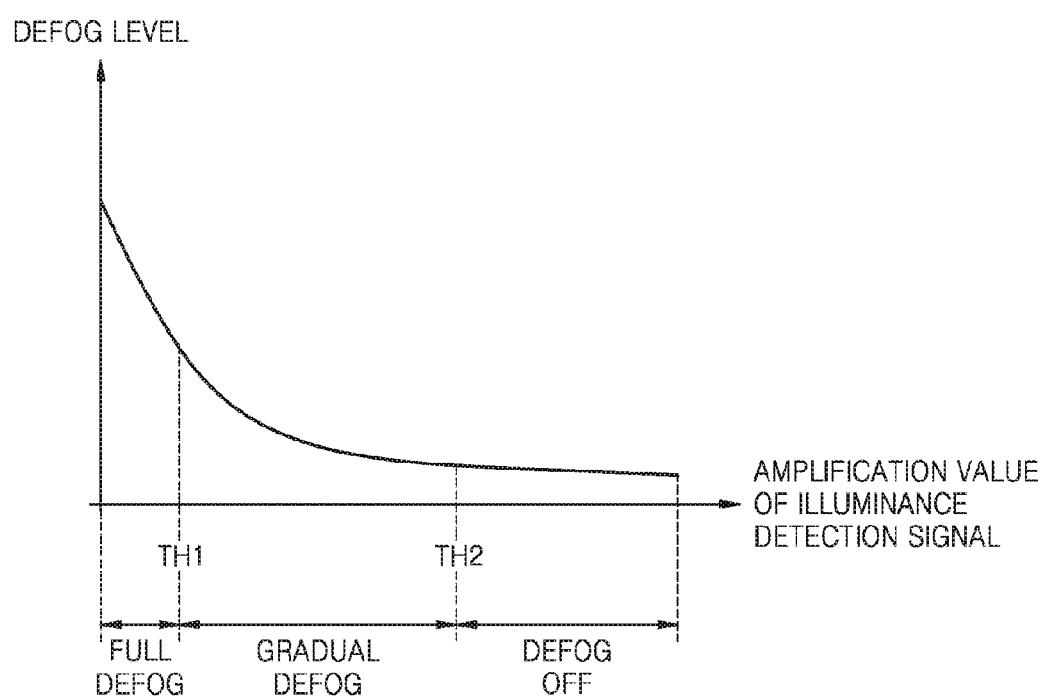
FIG. 4 is a graph showing a relationship between an amplification value of an illuminance detection signal and a defog level, according to an exemplary embodiment.

FIG. 4 is a graph showing a relationship between an amplification value of an illuminance detection signal and a defog level, according to an exemplary embodiment. A graph or a lookup table, in which pre-obtained amplification values of illuminance detection signals and corresponding defog levels are indicated, may be pre-stored as a database.

An x-axis of the graph indicates an amplification value of an illuminance detection signal, and a y-axis of the graph indicates a defog level. When an amplification value increases, i.e., when an illuminance level decreases, a defog level decreases.

The level determiner 310 may set a first threshold value TH1 and a second threshold value TH2 such that a defog function is adaptively performed. For example, the first threshold value TH1 may be a threshold value of illuminance when surroundings start to darken, in which illuminance is less than or equal to 30 lux, and the second threshold value TH2 may be a threshold value of nighttime illuminance in which illuminance is less than or equal to 10 lux.

When the amplification value of the illuminance detection signal is less than the first threshold value TH1, i.e., before surroundings start to darken, the level determiner 310 sets the defog level to a maximum defog level or "full defog." The defogger 330 applies highest defog compensation to the input image according to the maximum defog level.

When the amplification value of the illuminance detection signal is greater than the second threshold value TH2, i.e., when it is a nighttime, the level determiner 310 sets the defog level to a minimum defog level or "defog off." The defogger 330 does not apply defog compensation on the input image according to the minimum defog level.

When the amplification value of the illuminance detection signal is between the first and second threshold values TH1 and TH2, the level determiner 310 may determine a respective defog level corresponding to the amplification value of the illuminance detection signal based on the graph of FIG. 4. The level determiner 310 gradually reduces the defog level down to the minimum defog level as the amplification value of the illuminance detection signal changes from the first threshold value TH1 to the second threshold value TH2, i.e., as the surroundings darken. The defogger 330 reduces application intensity of the defog compensation performed on the input image as the defog level reduces.

Referring again to FIG. 2, the defogger 330 includes a histogram generator 340, an analyzer 350, a fog detector 360, and a scaler 370.

The histogram generator 340 generates a histogram of the input image. A histogram indicates a brightness value (intensity), i.e., a luminance distribution, of an image, and is a graph in which an x-axis denotes the brightness value and a y-axis denotes a frequency indicating the number of pixels having a pixel value corresponding to the brightness value in the image. A luminance distribution is skewed to the left in a histogram of a dark image and is skewed to the right in a histogram of a bright image.

The histogram generator 340 uses histogram data of a log scale. Because brightness of an image sensor with respect to brightness of a light reacts in a log scale, by using histogram data of the log scale, levels of the histogram may be minutely divided in a dark region and may be largely divided in a bright region, and thus a fog image may be efficiently analyzed. The histogram generator 340 detects luminance per pixel in the input image, and generates the histogram by accumulating the number of pixels per luminance.

FIG. 5 is a table of a histogram of a log scale with respect to 12-bit input image data, according to an exemplary embodiment. Herein, a dynamic range for gradation expression is determined according to the number of bits in image data, and the dynamic range may be classified as histogram data of a log scale.

For example, an 8-bit input image may have a dynamic range for gradation expression from 0 to 255 levels, and a 12-bit input image may have a dynamic range for gradation expression from 0 to 4096 levels. In FIG. 5, a dynamic range from 0 to 4096 levels of the 12-bit input image (Y data[11:0]) is divided into 56 regions by using a histogram index 0 HIST[0] to a histogram index 55 HIST[55]. Each of the histogram indexes 0 through 55 HIST[0] through HIST[55] represents a luminance value in a range, and hereinafter, a histogram index is used mixed with a histogram region.

Referring again to FIG. 2, the analyzer 350 calculates skewness and kurtosis of a histogram. The analyzer 350 calculates the skewness indicating a skew direction and skew amount of the histogram, and the kurtosis indicating a sharpness of the histogram. Equations 1 and 2 below are respectively used to calculate the skewness and the kurtosis. Here, S denotes standard deviation, x denotes a luminance value, and n denotes a number of pixels.

$$\text{Skewness} = \frac{\frac{1}{n}\sum_{i=1}^{n}(x_i - \bar{x})^3}{S^3} \quad (1)$$

$$\text{Kurtosis} = \frac{\frac{1}{n}\sum_{i=1}^{n}(x_i - \bar{x})^4}{S^4} \quad (2)$$

The fog detector 360 may determine whether to perform a defog function and a fog condition based on a result of analyzing the histogram.

Figure 6:
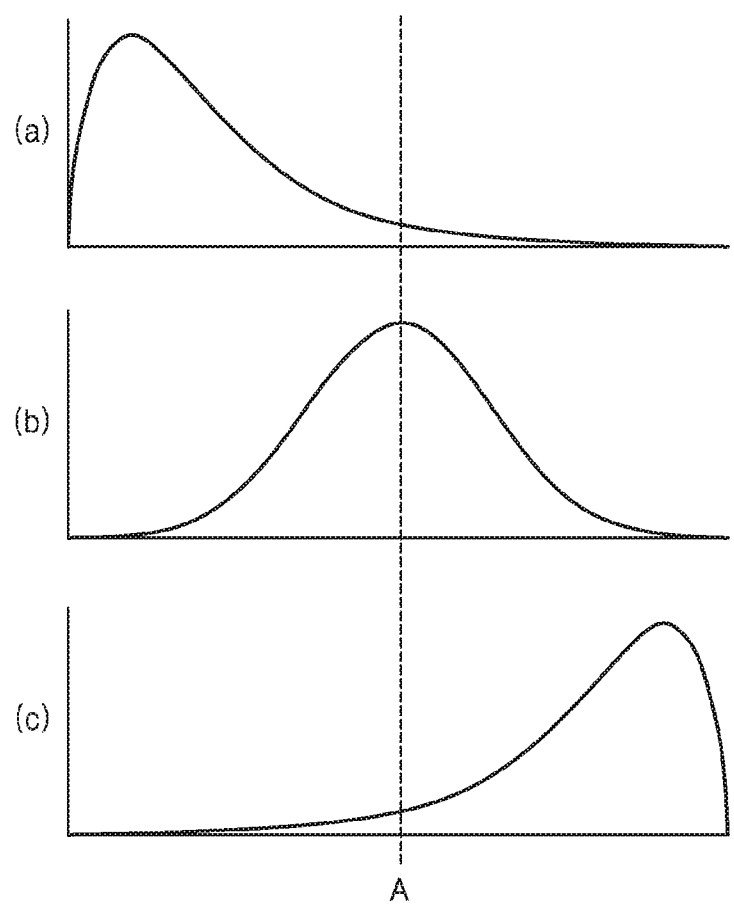
FIGS. 6 and 7 are graphs of skewness and kurtosis, respectively, of a histogram, according to an exemplary embodiment.
Figure 7:
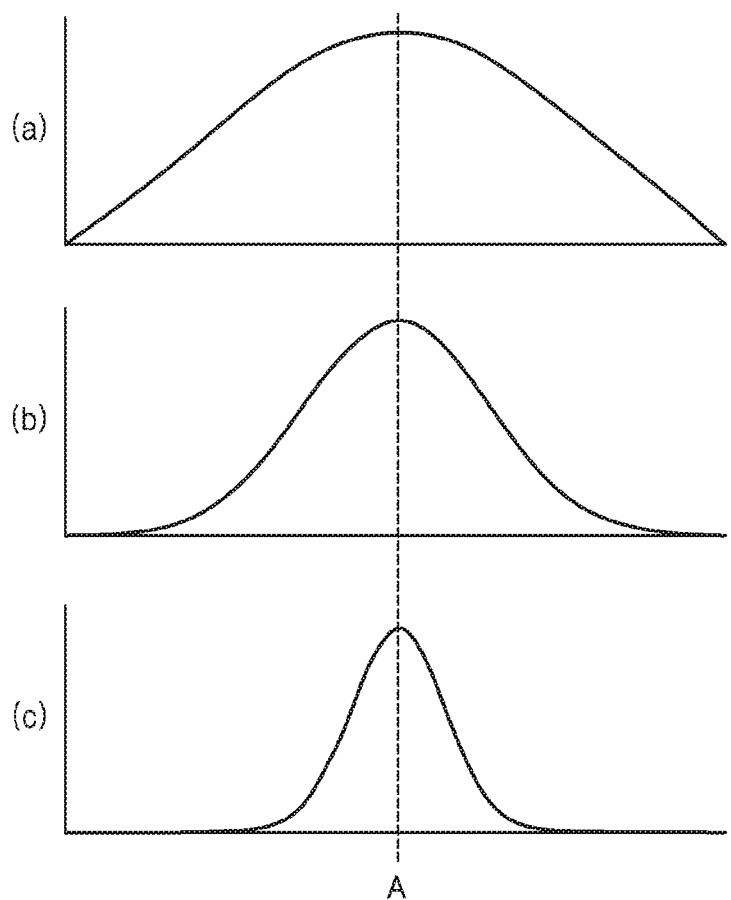

FIGS. 6 and 7 are graphs of skewness and kurtosis, respectively, of a histogram, according to an exemplary embodiment. Portion (a) of FIG. 6 is a distribution diagram of positive skewness (skewness>0), and portion (c) of FIG. 6 is a distribution diagram of negative skewness (skewness<0). Portion (b) of FIG. 6 is a distribution diagram in which skewness is zero. The fog detector 360 determines that fog compensation is performed when the skewness with respect to an average luminance A is within a reference range, and that fog compensation is not performed when the skewness with respect to the average luminance A is outside the reference range.

For example, when an absolute value of the skewness is greater than a threshold value (|Skewness|>threshold value (e.g., 0.5)), the fog detector 360 determines that the histogram is skewed not due to fog, but due to saturation caused by a sunlight or due to a very dark environment caused by a nearby building, and thus determines that defog compensation is not performed. Also, when the absolute value of the skewness is less than or equal to the threshold value (|Skewness|≤0.5), the defog detector 360 determines that the histogram is slightly skewed due to fog, and thus determines that defog compensation is performed. The threshold value may be set by a user while considering a scene or a photographing environment.

Kurtosis of distribution diagrams increases from portions (a) to (c) of FIG. 7. The fog detector 360 determines that defog compensation is performed when the kurtosis with respect to the average luminance A is within a reference range, and that defog compensation is not performed when the kurtosis with respect to the average luminance A is outside the reference range.

For example, when the kurtosis is greater than or equal to a threshold value (Kurtosis≥threshold value (e.g., 3), in portions (b) and (c) of FIG. 7), the fog detector 360 determines that a concentration phenomenon is generated due to fog, and thus determines that defog compensation is performed. Also, when the kurtosis is less than the threshold value (Kurtosis<3, in portion (a) of FIG. 7), the fog detector 360 determines that the histogram is normal, and thus determines that defog compensation is not performed. The threshold value may be set by a user while considering a scene or a photographing environment.

Upon determining that the defog compensation is to be performed, the fog detector 360 detects a fog condition (or a fog state). As a fog degree increases, a minimum value of luminance in the histogram increases, and a difference (or a ratio) between the minimum value and a maximum value of the luminance decreases. Thus, the fog detector 360 may detect the fog condition by determining a minimum luminance value and a maximum luminance value in a histogram of an input image.

Figure 8:
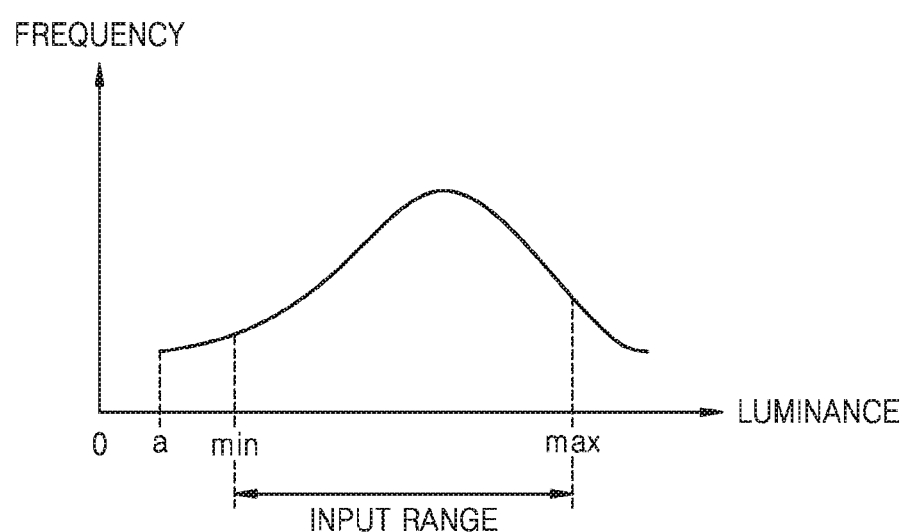
FIG. 8 is a histogram showing a relationship between a frequency and a luminance according to an exemplary embodiment.

FIG. 8 is a histogram showing a relationship between a frequency and a luminance according to an exemplary embodiment.

Referring to FIG. 8, an x-axis of the histogram denotes luminance represented by histogram indexes 0 to 55 HIST[0] to HIST[55] of FIG. 5, and a y-axis of the histogram denotes a number of pixels (frequency) corresponding to each histogram index.

The fog detector 360 detects a central value a of a first index (a first histogram region) from which the histogram starts, a central value min of a histogram region in which a cumulative probability from the first histogram region is a minimum reference probability, and a central value max of a histogram region in which a cumulative probability from the first histogram region is a maximum reference probability.

The fog detector 360 detects the central value min as an effective first minimum luminance value and the central value max as an effective first maximum luminance value. Here, the first minimum reference probability may be a cumulative probability of 5% (0.05) as shown in Equation 3 below, and the first maximum reference probability may be a cumulative probability of 95% (0.95) as shown in Equation 4 below.

$$\int_a^{min} f(x)dx \cong 0.05 \quad (3)$$

$$\int_a^{max} f(x)dx \cong 0.95 \quad (4)$$

Also, when it is determined that the defog compensation is not performed, i.e., when at least one among the skewness and the kurtosis is outside the reference range, the fog detector 360 reduces the minimum reference probability according to a degree to which the at least one among the skewness and the kurtosis is outside the reference range. Accordingly, the first minimum luminance value is decreased, and the fog degree is decreased. When the fog degree decreases, a defog degree described later may also decrease.

For example, when an absolute value of the skewness of the histogram is greater than a threshold value (|Skewness|>0.5) and/or the kurtosis of the histogram is less than a threshold value (Kurtosis<3), the fog detector 360 does not immediately stop defog compensation, but sets a minimum reference probability that is lower than that applied when the defog compensation is performed, and detects a first minimum luminance value corresponding to the set minimum reference probability. For example, the set first minimum luminance value may be a cumulative probability of 3% (0.03), in which a minimum reference probability is 3% (0.03) lower than 5% (0.05). The fog detector 360 gradually reduces a minimum reference probability as a degree to which at least one among the skewness and the kurtosis is outside the reference range increases, and correspondingly gradually decreases the first minimum luminance value.

Accordingly, a defog degree according to an illuminance reduction described later is additionally reduced.

Referring again to FIG. 2, the scaler 370 receives the control signal S1 indicating a defog level, and scales the input image by adjusting the first minimum luminance value and the first maximum luminance value of the input image respectively to a second minimum luminance value and a second maximum luminance value. In other words, the scaler 370 scales an input range between the first minimum luminance value and the first maximum luminance value of the input image to be within a dynamic range of reference gradation (hereinafter, referred to as a 'reference dynamic range'). A reference dynamic range is a maximum luminance range expressible by an image processor, and may be determined according to a number of bits of image data. For example, a reference dynamic range may be 0 to 255 in an 8-bit input image and may be 0 to 4096 in a 12-bit input image.

The scaler 370 scales the input image by setting the minimum luminance value detected from the input image to a lower value and the maximum luminance value detected from the input image to a higher value, thereby uniformizing entire luminance of the input image to increase contrast. Accordingly, an output image OUTPUT obtained by removing fog from the input image is output.

The scaler 370 does not perform defog compensation on the input image when a minimum defog level signal is received. In case of low illuminance, when a defog function is performed on the input image, the input image may darken, and thus objects in the input image may be difficult to be distinguished from each other. Thus, according to an exemplary embodiment, the defog function is not performed in case of the low illuminance.

When a maximum defog level signal is received, the scaler 370 scales the input image by setting the second minimum luminance value and the second maximum luminance value to a minimum luminance value and a maximum luminance value within a reference dynamic range to perform defog compensation. For example, the scaler 370 may scale the input image by setting the second minimum luminance value to 0 and the second maximum luminance value to 4096.

Equation 5 below is a scale algorithm for defog compensation. Here, Output denotes a scaled output image and Input denotes an input image.

$$\text{Output}(x, y) = 2^{image\ bit} \times \left[ \frac{\text{Input}(x, y) - \text{MIN}(\text{Input}(x, y))}{\text{MAX}(\text{Input}(x, y)) - \text{MIN}(\text{Input}(x, y))} \right] \quad (5)$$

When a defog level signal indicating a defog level is received, the scaler 370 scales the input image by setting the second minimum luminance value and the second maximum luminance value to an adjustment width within a reference dynamic range of the input image. At this time, the second minimum luminance value is greater than a minimum luminance value of the reference dynamic range, and the second maximum luminance value is less than a maximum luminance value of the reference dynamic range.

When the defog level decreases, an adjustment width between the first and second minimum luminance values and an adjustment width between the first and second maximum luminance values are decreased, and thus a scaling degree is decreased. In other words, according to an exemplary embodiment, when a defog level decreases, a defog degree is adaptively decreased, and a defog function is not performed in case of low illuminance.

Equations 6 and 7 below are equations for determining scale adjustment widths. Here, level denotes a defog level, Output denotes an output image of Equation 5, and LevelOutput denotes an output image scaled to an adjustment width determined according to a defog level. As a defog level decreases, the scaler 370 gradually decreases an adjustment width until a defog function is turned off, and gradually decreases a scale degree.

$$\text{Adjutment Width} = (\text{Output}(x, y) - \text{Input}(x, y)) \times \frac{\text{level}}{10} \quad (6)$$

$$\text{LevelOutput}(x, y) = \text{Input}(x, y) + \text{Adjustment Width} \quad (7)$$

Figure 3:
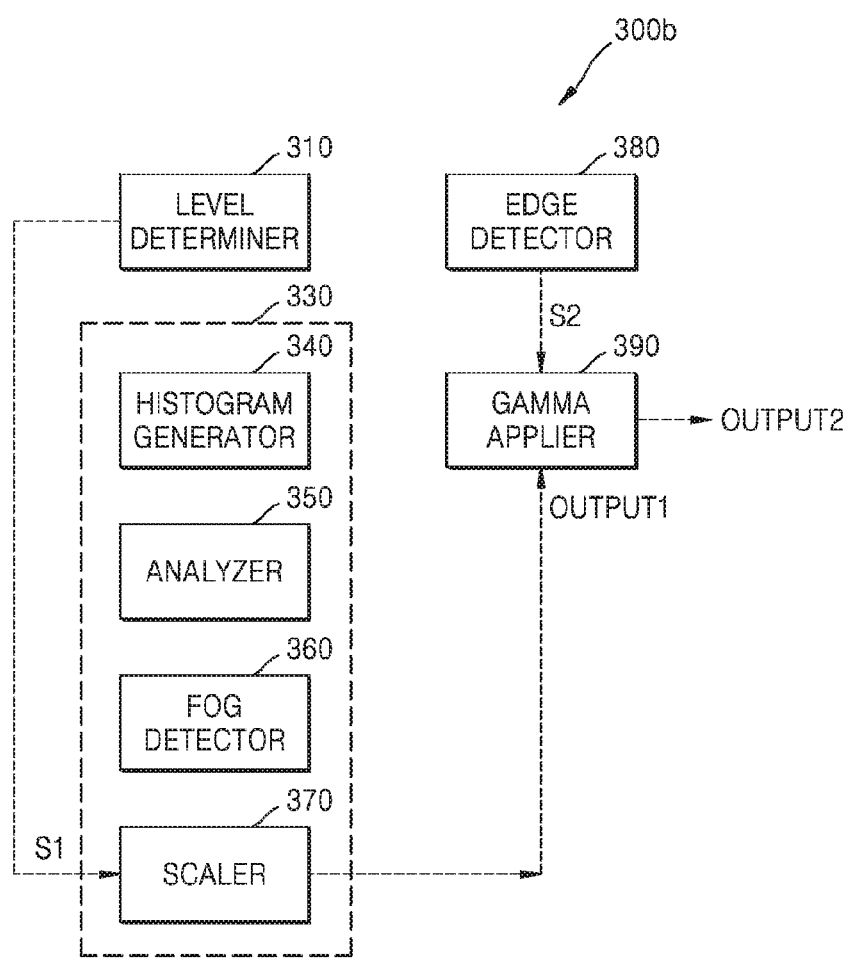
FIG. 3 is a block diagram of an image processor according to another exemplary embodiment.

FIG. 3 is a block diagram of an image processor 300b according to another exemplary embodiment.

Referring to FIG. 3, the image processor 300b according to an exemplary embodiment includes the level determiner 310, the defogger 330, an edge detector 380, and a gamma applier 390. Hereinafter, differences between the image processor 300a of FIG. 2 and the image processor 300b are mainly described.

The level determiner 310 may determine a defog level of an input image according to an amplification value of an illuminance detection signal input from the illuminance sensor 200.

The defogger 330 includes the histogram generator 340, the analyzer 350, the fog detector 360, and the scaler 370. The defogger 330 determines whether to perform a defog function on the input image and a fog condition of the input image based on a histogram of the input image, and may adaptively remove fog from the input image according to a defog level.

The edge detector 380 may detect an edge amount of the input image. The edge amount decreases as luminance of the input image increases due to fog. By using such a characteristic, the edge detector 380 may detect the edge amount from a graph or a lookup table indicating a relationship between an edge amount and luminance increased by a fog condition (a fog amount), and determine whether the edge amount is less than or equal to a third threshold value TH3.

Figure 9:
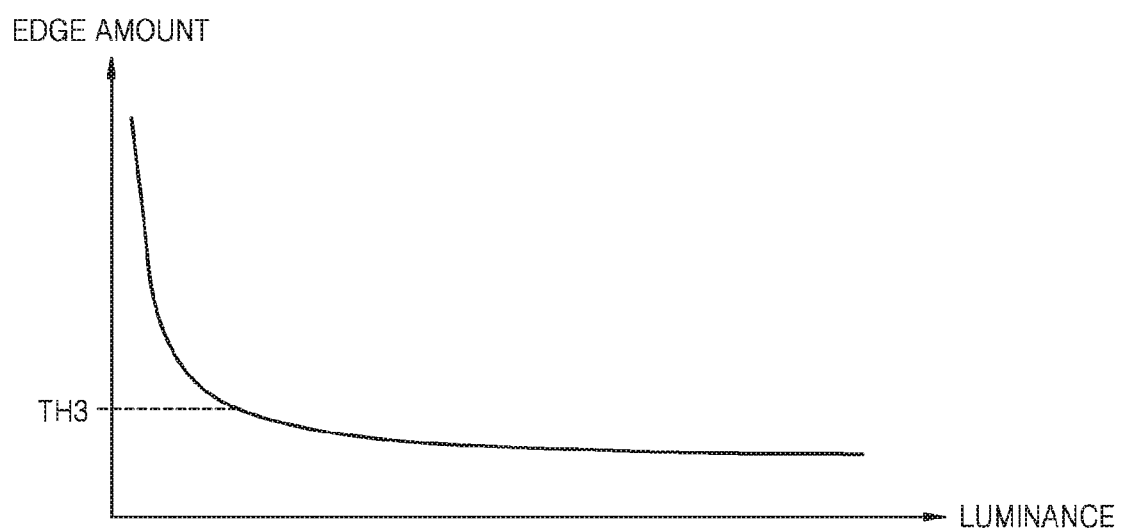
FIG. 9 is a graph showing a relationship between luminance and an edge amount, according to an exemplary embodiment.

FIG. 9 is a graph showing a relationship between luminance and an edge amount, according to an exemplary embodiment. A graph or a lookup table, in which pre-obtained luminance that increases according to a fog condition, and an edge amount corresponding to the luminance are indicated, may be pre-stored in a database.

Referring to FIGS. 3 and 9, the edge detector 380 outputs a control signal S2 when it is determined that the edge amount is less than or equal to the third threshold value TH3.

Referring again to FIG. 3, upon receiving the control signal S2 from the edge detector 380, the gamma applier 390 may improve contrast by applying a gamma curve on an output image OUTPUT1 output by the scaler 370. When a fog amount increases, minimum and maximum luminance values of an image are decreased, and thus contrast deteriorates. The gamma applier 390 adaptively determines a gamma curve according to a fog amount and applies the gamma curve on the output image OUTPUT1 to improve contrast of the output image OUTPUT1, thereby obtaining and outputting an output image OUTPUT2. Equation 8 below indicates contrast of an output image to which a gamma curve is applied.

$$\text{Defog Contrast} = MAX \times \left(\frac{\text{input}}{MAX}\right)^{\left(\frac{1}{\xi}\right)\left(\frac{\text{input}-0.5 \times MAX}{0.5 \times MAX}\right)} \quad (8)$$

Figure 10:
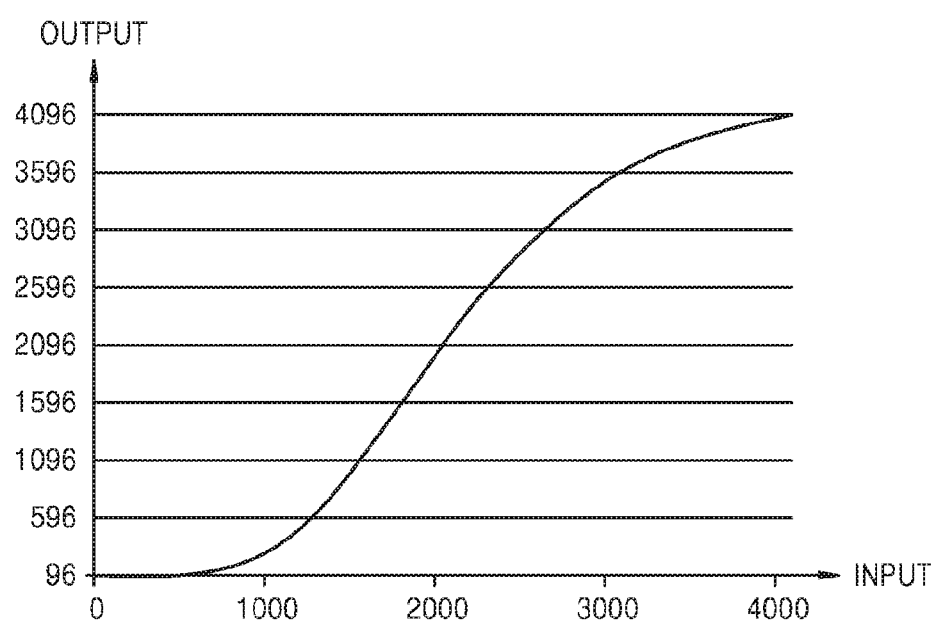
FIG. 10 is a graph of a gamma curve according to an exemplary embodiment.

FIG. 10 is a graph of a gamma curve according to an exemplary embodiment. The gamma curve may be adjusted according to a fog condition. An x-axis denotes a luminance value (a luminance level) of the output image OUTPUT output by the scaler 370, and a y-axis denotes a luminance value (a luminance level) of an output image to which a gamma curve is applied.

Figure 11:
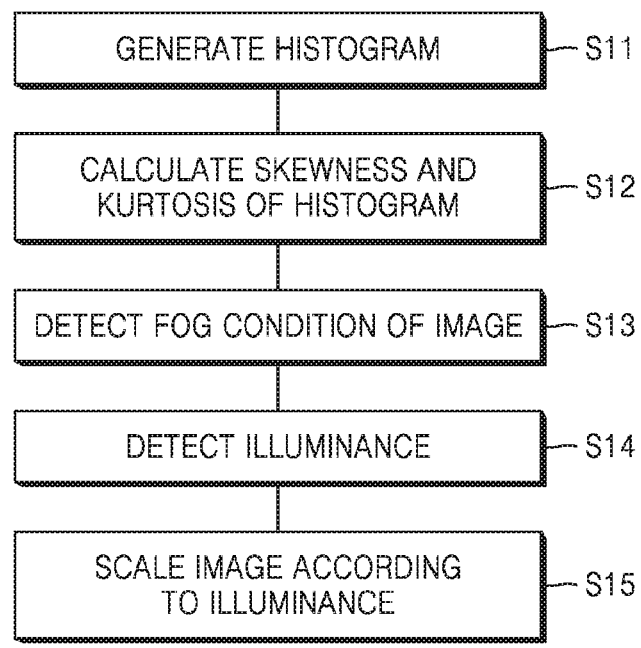
FIG. 11 is a flowchart of a defog method according to an exemplary embodiment.

FIG. 11 is a flowchart of a defog method according to an exemplary embodiment.

Referring to FIG. 11, in operation S11, when an image is input from an image sensor, a defog system or defog apparatus generates a histogram of the image. The defog system generates the histogram by using histogram data of a log scale.

In operation S12, the defog system calculates skewness and kurtosis of the histogram by analyzing the histogram. When fog is present in the image, the skewness is greater than or less than 0 and the kurtosis increases.

In operation S13, when the skewness and the kurtosis are within a reference range, the defog system determines that defog compensation is to be performed, and detects a fog condition of the image. A minimum luminance value and a maximum luminance value of the image vary according to the fog condition, and when a fog amount increases, $$\frac{\text{minimum luminance value}}{\text{maximum luminance value}}$$

decreases. The defog system detects a first minimum luminance value and a first maximum luminance value respectively corresponding to a minimum reference probability and a maximum reference probability pre-set from the histogram. For example, the minimum reference probability may be set to a minimum cumulative probability 5%, and the maximum reference probability may be set to a maximum cumulative probability 95%. Accordingly, by analyzing the histogram, the defog system may determine whether to perform a defog function and detect a fog condition.

The defog system may determine that defog compensation is not to be performed when the skewness and/or the kurtosis are outside the reference range. At this time, the defog system does not immediately stop the defog compensation, but reduces the minimum reference probability. Accordingly, the first minimum luminance value is also decreased. When the first minimum luminance value is decreased, a degree of defog compensation is decreased. When a degree to which skewness and/or the kurtosis are outside the reference range is increased, the defog system adjusts the minimum reference probability to be decreased. In other words, the defog system may reduce the minimum reference probability in proportion to the degree to which the skewness and/or the kurtosis are outside the reference range.

In operation S14, the defog system detects or receives information about ambient illuminance from an illuminance sensor. The defog system periodically receives an amplification value of an illuminance detection signal from the illuminance sensor. The illuminance sensor detects the ambient illuminance, and amplifies and outputs the ambient illuminance. Thus, when an environment is darker, the amplification value is higher. In other words, the illuminance detection signal output by the illuminance sensor is inversely proportional to an illuminance level. When the illuminance level is low, the amplification value is high, and when the illuminance level is high, the amplification value is low.

In operation S15, the defog system scales the image according to the ambient illuminance, and outputs the image on which defog compensation is performed.

The defog system sets a defog level to a maximum defog level when the amplification value of the illuminance detection signal is less than a first threshold value. The defog system uniformizes the image by full-scaling a current luminance range of the image up to a reference dynamic range according to the maximum defog level. In other words, the defog system scales the image by setting the first minimum luminance value and the first maximum luminance value respectively to a second minimum luminance value that is a minimum luminance value of the reference dynamic range and a second maximum luminance value that is a maximum luminance value of the reference dynamic range. The defog system may uniformize luminance of the image to increase contrast of the image, thereby outputting the image having a defog effect.

The defog system sets a defog level to a minimum defog level when the amplification value of the illuminance detection signal is greater than a second threshold value. The defog system does not scale the image according to the minimum defog level.

When the amplification value of the illuminance detection signal is between the first and second threshold values, the defog system sets a defog level to a respective defog level. The defog system calculates an adjustment width corresponding to a defog level, and scales the image as much as the adjustment width within the reference dynamic range. In other words, the defog system scales the image by setting the second minimum luminance value greater than the minimum luminance value of the reference dynamic range, and the second maximum luminance value less than the maximum luminance value of the reference dynamic range.

The defog system gradually decreases the defog level as the amplification value moves from the first threshold value to the second threshold value, and gradually decrease the adjustment width accordingly, thereby gradually decreasing a scaling degree, i.e., a defog degree, of the image.

Figure 12:
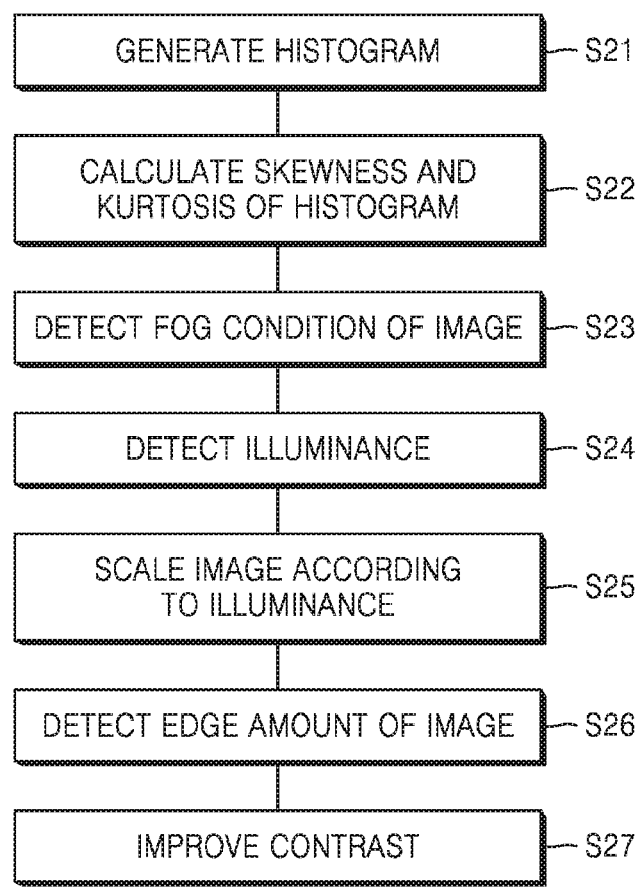
FIG. 12 is a flowchart of a defog method according to another exemplary embodiment.

FIG. 12 is a flowchart of a defog method according to another exemplary embodiment.

The defog method of FIG. 12 is different from that of FIG. 11 in that some operations are added in the defog method of FIG. 12, and the differences thereof are mainly described herein.

In operation S21, when an image is input from an image sensor, a defog system or defog apparatus generates a histogram of the image. In operation S22, the defog system calculates skewness and kurtosis of the histogram by analyzing the histogram. In operation S23, when the skewness and the kurtosis are within a reference range, the defog system determines that defog compensation is to be performed, and detects a fog condition of the image. In operation S24, the defog system periodically detects or receives information about ambient illuminance from an illuminance sensor. In operation S25, the defog system outputs the image on which the defog compensation is performed by scaling the image according to the ambient illuminance.

In operation S26, the defog system detects an edge amount of the image.

In operation S27, the defog system improves contrast by applying a gamma curve on the scaled output image when the edge amount of the image is less than or equal to a third threshold value.

Orders of performing operations of the defog methods of FIGS. 11 and 12 are not fixed, and may be changed.

A defog method according to an exemplary embodiment may automatically adaptively adjust intensity of a defog function by using ambient illuminance, skewness, kurtosis, an edge amount, and a statistical method. Also, a defog method according to an exemplary embodiment may prevent deterioration of image quality by automatically reducing a defog degree or not performing a defog function under a low illuminance environment, a saturated environment, and a no fog condition.

A defog method according to an exemplary embodiment may be used in fields of surveillance cameras, such as an analog camera and a network camera.

A defog system and a defog method according to one or more exemplary embodiments may reduce deterioration of image quality by adaptively, automatically applying a defog algorithm according to a current fog condition and illuminance.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

At least one of the components, elements, modules or units represented by a block as illustrated in FIGS. 1-3 (e.g., processor 300, defogger 330, etc.) may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A defog system comprising:
   an illuminance sensor configured to detect ambient illuminance; and
   at least one processor to implement:
      a level determiner configured to determine a defog level of an input image based on the ambient illuminance; and
      a defogger configured to determine whether to defog the input image based on skewness and kurtosis of a histogram of the input image, and, in response to the defogger determining to defog the input image, determine a fog condition of the input image based on a cumulative probability of the histogram, and defog the input image based on the defog level,
   wherein the defogger comprises:
      a histogram generator configured to generate the histogram of the input image:
      an analyzer configured to determine the skewness and the kurtosis of the histogram;
      a fog detector configured to, in response to the skewness and the kurtosis being within a range, detect a first minimum luminance, in which the cumulative probability of the histogram corresponds to a minimum reference probability, and a first maximum luminance, in which the cumulative probability of the histogram corresponds to a maximum reference probability and
      a scaler configured to scale the input image by resetting the first minimum luminance and the first maximum luminance respectively to a second minimum luminance and a second maximum luminance based on the defog level, and
   wherein the fog detector is further configured to, in response to at least one among the skewness and the kurtosis being outside the range, reduce the minimum reference probability, and detect the first minimum luminance, in which the cumulative probability of the histogram corresponds to the reduced minimum reference probability.

2. The defog system of claim 1, wherein the second minimum luminance is less than the first minimum luminance, and
wherein the second maximum luminance is greater than the first maximum luminance.

3. The defog system of claim 1, wherein the fog detector is further configured to reduce the minimum reference probability in proportion to a degree to which the at least one among the skewness and the kurtosis is outside the range.

4. The defog system of claim 1, wherein the scaler is further configured to reduce, as the defog level decreases, an adjustment width between the first minimum luminance and the second minimum luminance and an adjustment width between the first maximum luminance and the second maximum luminance.

5. The defog system of claim 1, wherein the level determiner is further configured to:
output a maximum defog level signal in response to an amplification value of the ambient illuminance being less than a first threshold;
output a minimum defog level signal in response to the amplification value being greater than a second threshold; and
output a respective defog level signal in response to the amplification value being between the first threshold and the second threshold.

6. The defog system of claim 5, wherein the level determiner is further configured to change the respective defog level signal as the amplification value changes between the first threshold and the second threshold.

7. The defog system of claim 5, wherein the level determiner is further configured to reduce the respective defog level signal as the amplification value changes from the first threshold to the second threshold.

8. The defog system of claim 1, further comprising:
an edge detector configured to detect an edge amount of the input image; and
a gamma applier configured to, in response to the edge amount being less than or equal to a threshold, apply a gamma curve to the defogged input image based on a relationship between the edge amount and a preset luminance.

9. A defog method comprising:
detecting an ambient illuminance;
determining a defog level of an input image based on the ambient illuminance;
determining whether to defog the input image based on skewness and kurtosis of a histogram of the input image;
in response to the determining to defog the input image, determining a fog condition of the input image based on a cumulative probability of the histogram, and defogging the input image based on the defog level;
generating the histogram of the input image; and
determining the skewness and the kurtosis of the histogram
wherein the determining the fog condition comprises, in response to the skewness and the kurtosis being within a range, detecting a first minimum luminance, in which the cumulative probability of the histogram corresponds to a minimum reference probability, and a first maximum luminance, in which the cumulative probability of the histogram corresponds to a maximum reference probability,
wherein the defogging the input image comprises scaling the input image by resetting the first maximum luminance and the first maximum luminance respectively to a second minimum luminance and a second maximum luminance based on the defog level, and
wherein the determining the fog condition further comprises, in response to at least one among the skewness and the kurtosis being outside the range, reducing the minimum reference probability, and detecting the first minimum luminance, in which the cumulative probability of the histogram corresponds to the reduced minimum reference probability.

10. The defog method of claim 9, wherein the second minimum luminance is less than the first minimum luminance, and
the second maximum luminance is greater than the first maximum luminance.

11. The defog method of claim claim 9, wherein the reducing the minimum reference probability comprises reducing the minimum reference probability in proportion to a degree to which the at least one among the skewness and the kurtosis is outside the range.

12. The defog method of claim 9, wherein the scaling the input image comprises reducing, as the defog level decreases, an adjustment width between the first minimum luminance and the second minimum luminance and an adjustment width between the first maximum luminance and the second maximum luminance.

13. The defog method of claim 9, wherein the determining the defog level comprises:
outputting a maximum defog level signal in response to an amplification value of the ambient illuminance being less than a first threshold;
outputting a minimum defog level signal in response to the amplification value being greater than a second threshold; and
outputting a respective defog level signal in response to the amplification value being between the first threshold and the second threshold.

14. The defog method of claim 13, wherein the outputting the respective defog level signal comprises changing the respective defog level signal as the amplification value changes between the first threshold and the second threshold.

15. The defog method of claim 13, wherein the outputting the respective defog level signal comprises reducing the respective defog level signal as the amplification value changes from the first threshold to the second threshold.

16. The defog method of claim 9, further comprising:
detecting an edge amount of the input image; and
in response to the edge amount being less than or equal to a threshold, applying a gamma curve to the defogged input image based on a relationship between the edge amount and a preset luminance.

* * * * *